(Model.)

2 Sheets—Sheet 1.

J. B. MORGAN.
Lawn Rake.

No. 242,022. Patented May 24, 1881.

WITNESSES
C. R. Newman
J. B. Fullerton

James B. Morgan, INVENTOR
By his Attorney (Model.)

J. B. MORGAN.
Lawn Rake.

No. 242,022. Patented May 24, 1881.

WITNESSES
C. R. Newman
J B Fullerton

James B. Morgan INVENTOR
By his Attorney
J B Fullerton

UNITED STATES PATENT OFFICE.

JAMES B. MORGAN, OF DAVENPORT, IOWA.

LAWN-RAKE.

SPECIFICATION forming part of Letters Patent No. 242,022, dated May 24, 1881.

Application filed March 19, 1881. (Model.)

*To all whom it may concern:*

Be it known that I, JAMES B. MORGAN, a citizen of the United States, residing at Davenport, in the county of Scott and State of Iowa, have invented certain new and useful Improvements in Lawn-Rakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to lawn-rakes, and is intended to provide a neat machine adapted for operation by hand to gather up cleanly all cut grass, leaves, or other litter into a removable box or receptacle.

It consists in the combination of a revolving and stationary rake with an endless apron or carrier operated by the driving-wheels of the machine when pushed or driven by means of handles attached to the frame. It may also be operated by horse-power.

Figure 1:
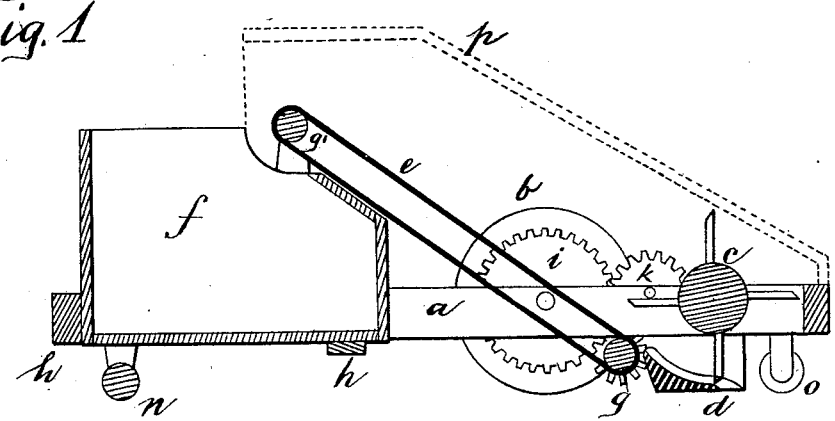
Figure 2:
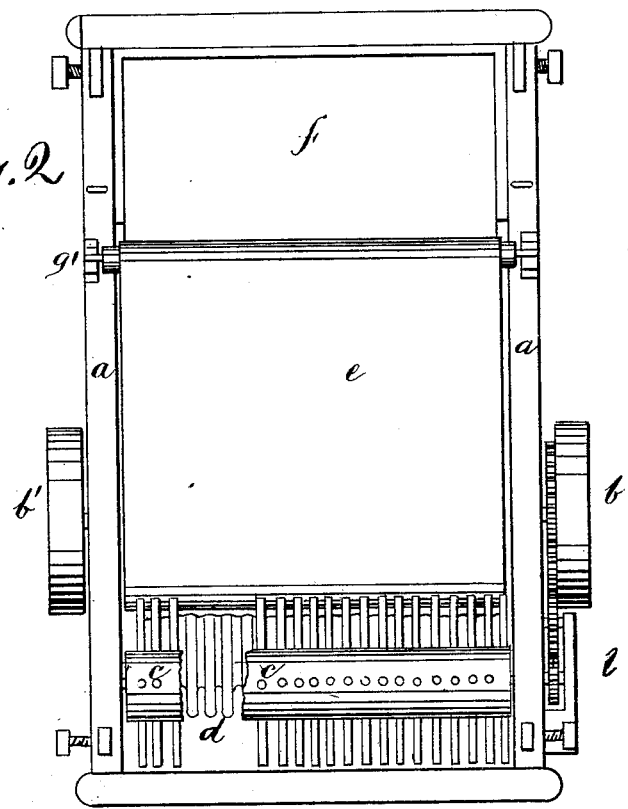
Figure 3:
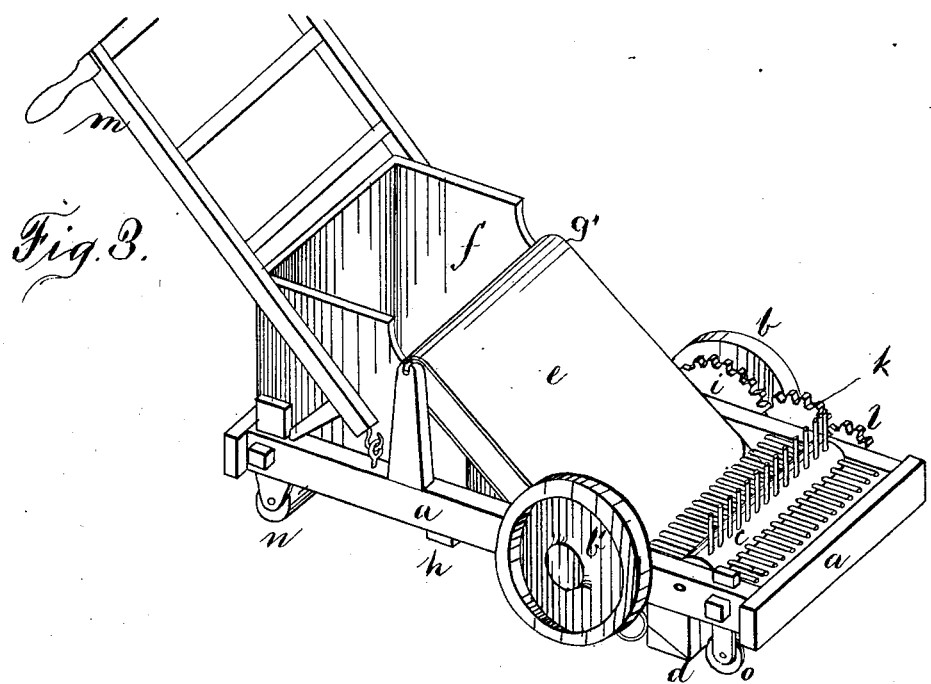

In the drawings, Figure 1, Sheet 1, is a cross-sectional view. Fig. 2 is a top view. Fig. 3, Sheet 2, is a perspective view of the rake without the cover.

I construct my machine as follows:

A longitudinal frame, $a$, is mounted upon a pair of driving-wheels, $b$ $b'$. Within and attached to this frame are arranged the revolving rake $c$, consisting of a cylinder provided with four or more rows of projecting teeth with beveled ends. This revolving rake gathers the cut grass and litter upon a stationary rake, $d$, which is flat on the under or ground surface and concave on the upper. This stationary rake $d$ is set below and back of the revolving rake $c$. Its upper surface is concave to about the extent of the circle described by the periphery of the teeth of the revolving rake. It has the same number of teeth as each row in the revolving rake, and they are so set that the points of the teeth of the revolving rake pass between those of the concave rake.

In operation the teeth of the concave rake pass beneath the surface of the stubble and catch any substance that may be embedded therein and raise the cut grass or litter from the ground, when it is caught by the teeth of the revolving rake and carried to and upon the traveling apron $e$, and thence to the receptacle $f$. This stationary rake is made of one piece, with projecting teeth alternating with the spiked teeth of the cylinder, so that the cut grass and litter gathered upon its concave surface by the revolving rake cannot fall back upon the ground, but are carried upon the apron and to the receptacle, thus removing not only the short grass, but all leaves and other unsightly trash from the surface of the lawn.

It will be observed that the teeth of the cylinder also rake the ground, co-operating with the teeth of the stationary rake, which first lifts from the stubble the litter to be carried off.

The apron or straw-carrier $e$ consists of a stout piece of canvas or other suitable material, the ends being joined together and passing over rollers $g$ $g'$.

The receptacle $f$ is a box or basket made to fit within the sides of the frame and resting upon the cross-braces $h$ $h$. It requires no fastening, and may be easily removed from the machine when the litter is to be emptied.

The driving-wheel $b$ is provided with a pinion, $i$, on its inner side. This pinion meshes with the loose pinion $k$, which, in turn, meshes with the small pinion $l$, by which the revolving rake is operated. The carrier is also operated by a pinion on the end of the roller $g$, meshing also with the pinion $i$ on the driving-wheel $b$. The carrier thus revolves continuously with the rake, the whole movement being effected by simply pushing the machine forward by means of the handles $m$, or by drawing the machine forward if horse-power be used.

A roller, $n$, is hung by adjustable stirrups to the rear part of the frame, by means of which the height of the forward rakes from the ground may be elevated or depressed.

A pair of small wheels, $o$, also hung to adjustable stirrups, are attached to each side of the forward part of the frame. These wheels serve to protect the rake in rough ground and enable it to rise over sudden elevations or obstructions.

A movable cover, $p$, is provided to inclose the carrier and forward parts of the machinery.

I claim as of my invention and desire to secure by Letters Patent—

1. The arrangement, in a lawn-rake, of the concave stationary rake *d*, and cylindrical rake *c*, and endless apron *e*, operated by the driving-wheels *b b* and pinions *g i k l*, substantially as shown and described, and for the purposes set forth.

2. The combination, in a lawn-rake operated by hand, of the removable receptacle *f*, fitted in the frame *a a*, provided with the shifting-handle *m*, with the endless apron *e*, and revolving rake *c*, operated by means of pinions and the motion of the driving-wheels, substantially as described and shown, and for the purposes set forth.

In testimony whereof I affix my signature in presence of two witnesses.

JAMES B. MORGAN.

Witnesses:
  A. H. THOMPSON,
  SAMUEL PORTER.